United States Patent
Kobayashi

(10) Patent No.: US 8,755,261 B2
(45) Date of Patent: Jun. 17, 2014

(54) OPTICAL INFORMATION RECORDING MEDIUM AND OPTICAL INFORMATION RECORDING MEDIUM PLAYBACK APPARATUS

(71) Applicant: Sony Corporation, Minato-ku (JP)

(72) Inventor: Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/028,611

(22) Filed: Sep. 17, 2013

(65) Prior Publication Data

US 2014/0086037 A1    Mar. 27, 2014

(30) Foreign Application Priority Data

Sep. 24, 2012   (JP) ................................. 2012-209172

(51) Int. Cl.
   *G11B 7/24*    (2013.01)
(52) U.S. Cl.
   USPC ...................... 369/275.3; 369/275.4; 369/277
(58) Field of Classification Search
   CPC .... G11B 7/00745; G11B 7/261; G11B 7/007; G11B 7/26; G11B 7/24056; G11B 7/24082; B11B 7/00718
   USPC ................... 369/275.1–275.5, 279, 278, 277
   See application file for complete search history.

(56) References Cited

U.S. PATENT DOCUMENTS 7,224,651 B2 *   5/2007   Ko et al. ..................... 369/47.27
7,417,942 B2 *   8/2008   Miyamoto et al. ......... 369/275.3

FOREIGN PATENT DOCUMENTS

| JP | 09-219024  | 8/1997 |
| JP | 2003-178464 | 6/2003 |
| JP | 2006-228293 | 8/2006 |

* cited by examiner

*Primary Examiner* — Ali Neyzari
(74) *Attorney, Agent, or Firm* — Wolf, Greenfield & Sacks, P.C.

(57) ABSTRACT

An optical information recording medium operated by CAV or zone CAV, wherein a groove that wobbles is formed in advance, and information is recorded in the groove and a land adjacent to the groove, an address is recorded by a wobble signal of the groove, the groove is alternately provided with a first section recording an address N by the wobble signal, and a second section recording an address (N−1) or (N+1) by the wobble signal, in two groove tracks sandwiching a land track, the first section of one of the groove tracks matches the second section of the other of the groove tracks, and an address of the groove is read from the first section, and an address of the land is read from the first and the second sections located on both sides of the land track, and recording a same address.

10 Claims, 10 Drawing Sheets

FIG. 3

| ADIP UNIT NUMBER | ADIP UNIT TYPE | ADIP NIBBLE BIT NUMBER | ADIP CODE WORD NIBBLE NUMBER |
|---|---|---|---|
| 0 | MONOTONE | --- | --- |
| 1 | sync_0 | --- | |
| 2 | MONOTONE | --- | |
| 3 | sync_1 | --- | |
| 4 | MONOTONE | --- | |
| 5 | sync_2 | --- | |
| 6 | MONOTONE | --- | |
| 7 | sync_3 | --- | |
| 8 | REFERENCE | --- | |
| 9 | data_x | b3 | C0 |
| 10 | data_x | b2 | |
| 11 | data_x | b1 | |
| 12 | data_x | b0 | |
| 13 | REFERENCE | | --- |
| 14 | data_x | b3 | C1 |
| 15 | data_x | b2 | |
| 16 | data_x | b1 | |
| 17 | data_x | b0 | |
| 18 | REFERENCE | | |
| 78 | REFERENCE | | --- |
| 79 | data_x | b3 | C14 |
| 80 | data_x | b2 | |
| 81 | data_x | b1 | |
| 82 | data_x | b0 | |

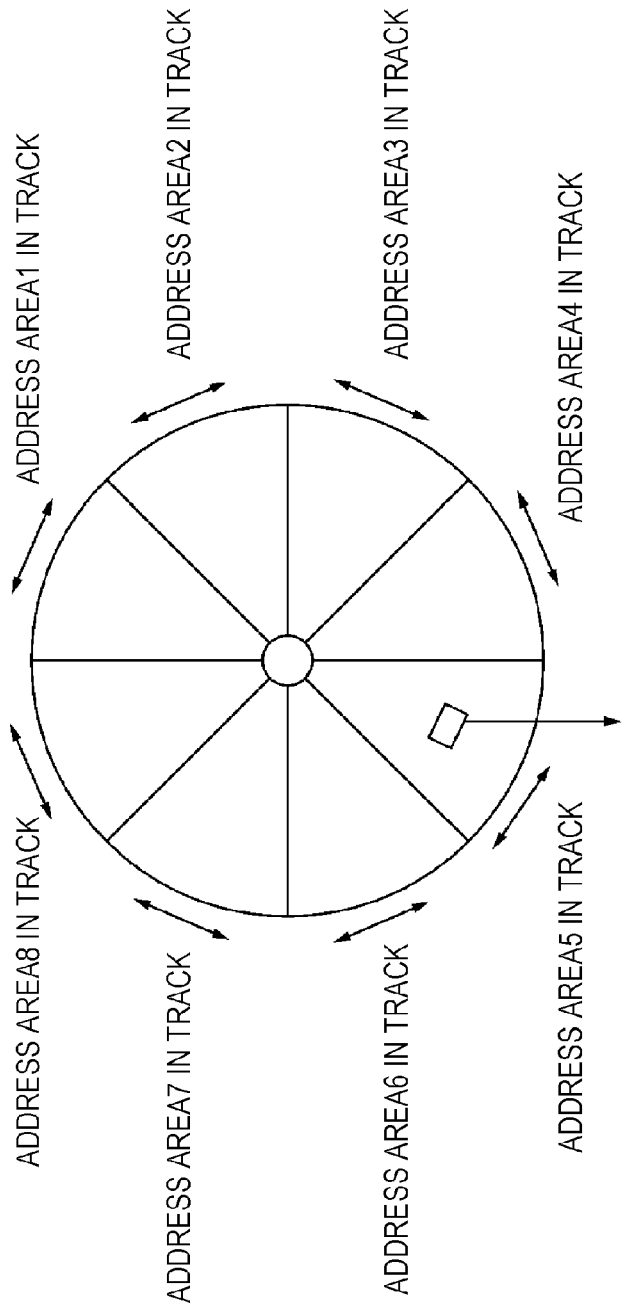
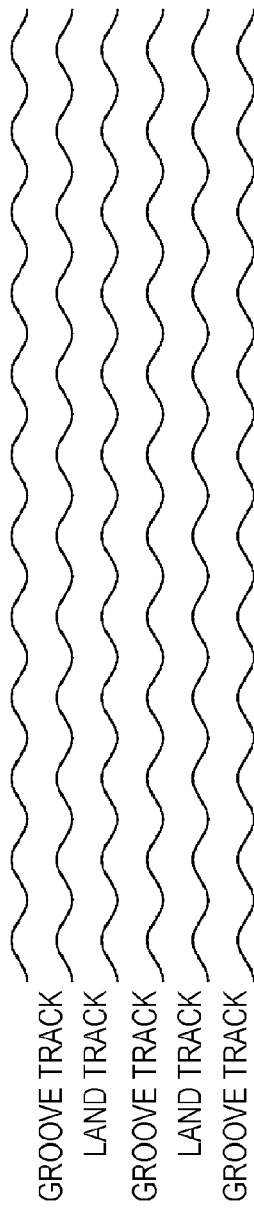
FIG. 7A
FIG. 7B

FIG. 8

| | | | | | |
|---|---|---|---|---|---|
| GROOVE TRACK #100 | #100_1 | #99_2 | #100_3 | #99_4 | #100_5 | #99_6 |
| LAND TRACK #100 | #100_1 | × | #100_3 | × | #100_5 | × |
| GROOVE TRACK #101 | #100_1 | #101_2 | #100_3 | #101_4 | #100_5 | #101_6 |
| LAND TRACK #101 | × | #101_2 | × | #101_4 | × | #101_6 |
| GROOVE TRACK #102 | #102_1 | #101_2 | #102_3 | #101_4 | #102_5 | #101_6 |

TRACK (RECORD AND PLAYBACK) DIRECTION →

OPTICAL INFORMATION RECORDING MEDIUM AND OPTICAL INFORMATION RECORDING MEDIUM PLAYBACK APPARATUS

BACKGROUND

The present disclosure relates to an optical information recording medium applied to a recordable optical disc, for example, and an optical information recording medium playback apparatus.

To date, optical discs for recording information or playing back recorded information using laser light have been put to practical use. For types of optical discs, there are a read-only type, a write-once type, and a rewritable type. In optical discs of the write-once type and the rewritable type, it is necessary for address information indicating a position on an optical disc to be recorded in advance for recording information.

For a method of recording address information, there are two types of methods that are familiar. One of the methods is to record address information as a pre-formatted pit. The other of the methods is to modulate a signal that forms a gutter, which is called a wobble, by address information. Recording a pre-formatted pit has a problem in that this reduces a user-data recording area, and thus decreases the recording capacity of an optical disc. The wobble method has an advantage because of having no such problem. In this regard, a gutter is referred to as a groove, and a track formed by a groove is called a groove track. A groove is defined as a part that is irradiated by laser light at the time of manufacturing an optical disc. An area sandwiched by adjacent grooves is referred to as a land, and a track formed by a land is called a land track.

When an address is recorded by wobbling, in order to further increase a recording capacity, it is desirable to use a method of recording data on both a groove track and a land track (suitably referred to as a land/groove recording method). In the land/groove recording method, it is possible to record address information for a groove track by deflecting laser light at the time of cutting. However, it is difficult to record an address for a land track by wobbling. When a land track is scanned, wobbles on both of the groove tracks are reproduced. Moreover, these wobbles represent information on different groove tracks, and the wobble phases are not aligned so that it is difficult to normally reproduce the wobbles.

Up to now, in the land/groove recording method, a proposal has been made of an optical disc that enables both of the addresses of a groove track and a land track to be reproduced. Japanese Unexamined Patent Application Publication No. 9-219024 has disclosed a method in which when an address is recorded in a groove track by wobbling, the address is recorded intermittently, and a phase of a recording position of the address is inverted between adjacent groove tracks. In this manner, when a wobble track is reproduced, address information that is originally recorded is intermittently reproduced, and when a land track is reproduced, addresses of the groove tracks that are adjacent on both sides are alternately reproduced. Accordingly, it is possible to obtain wobble information (address information) either at the time of scanning a groove or at the time of scanning a land.

In the techniques described in Japanese Unexamined Patent Application Publication Nos. 2003-178464 and 2006-228293, a land track and a groove track are individually wobbled, address information is recorded on one side wall of each track by the wobbling. Further, an address information block in a wobble track and an address information block in a groove track are disposed with being shifted in the track direction.

SUMMARY

In the technique described in Japanese Unexamined Patent Application Publication No. 9-219024, an address of a land track is produced by reproducing an address of one groove track in the two adjacent groove tracks. Accordingly, there is a high possibility that a groove address becomes unable to be read by off track. Further, in the technique described in Japanese Unexamined Patent Application Publication No. 9-219024, a groove track is provided with wobbling intermittently. The wobbling is a signal that becomes a basis for generating a clock corresponding to a position on an optical disc. The clock is a signal that is necessary both for recording and playback. Accordingly, as the technique described in Japanese Unexamined Patent Application Publication No. 9-219024, the fact that there are intermittent sections that have no wobbling in a groove track is disadvantageous in generating a clock with high precision.

In the techniques described in Japanese Unexamined Patent Application Publication Nos. 2003-178464 and 2006-228293, there is no break in wobbling, and thus there is no problem in generation of a clock. However, in addition to a wobbling by a fundamental frequency, it is necessary to wobble one side wall of a groove in order to record auxiliary information. It is difficult to form such wobbling by single laser light at the time of cutting, and thus there is a problem in that a cutting machine becomes complicated.

Accordingly, it is desirable to provide an optical information recording medium having no break in wobbling in a groove track, and allowed to be cut by a single beam, and an optical information recording medium playback apparatus.

According to an embodiment of the present disclosure, there is provided an optical information recording medium operated by CAV or zone CAV, wherein a groove configured to wobble is formed in advance, and information is recorded in the groove and a land adjacent to the groove, an address is recorded by a wobble signal of the groove, the groove is alternately provided with a first section recording an address N (=1, 2, 3, . . . ) by the wobble signal, and a second section recording an address (N−1) or (N+1) by the wobble signal, in two groove tracks located on both sides of a land track, the first section of one of the groove tracks matches the second section of the other of the groove tracks, and an address of the groove is read from the first section, and an address of the land is read from the first and the second sections located on both sides of the land track, and individually recording a same address.

According to another embodiment of the present disclosure, there is provided an optical information recording medium operated by CAV or zone CAV, wherein a groove configured to wobble is formed in advance, and information is recorded in the groove and a land adjacent to the groove, an address is recorded by a wobble signal of the groove, a plurality of track addresses N of a land, and a plurality of track addresses (N−1) or (N+1) of the land are formed on a groove track, the track address N (=1, 2, 3, . . . ) of the land is formed in adjacent grooves on both sides in a track traversing direction, with the track address N having a same angular phase and a same wobbling direction, and the track address (N−1) or (N+1) of the land is formed in the adjacent grooves on both sides in the track traversing direction with the track address (N−1) or (N+1) having a same angular phase and a same wobbling direction.

According to another embodiment of the present disclosure, there is provided an optical information recording medium playback apparatus for optically playing back an optical information recording medium operated by CAV or zone CAV, wherein a groove configured to wobble is formed in advance, and information is recorded in the groove and a land adjacent to the groove, an addresses is recorded by a wobble signal of the groove, the groove is alternately provided with a first section recording an address N (=1, 2, 3, ... ) by the wobble signal, and a second section recording an address (N−1) or (N+1) by the wobble signal, and in two groove tracks located on both sides of a land track, the first section of one of the groove tracks matches the second section of the other of the groove tracks, wherein an address of the groove is read from the first section, and an address of the land is read from the first and the second sections located on both sides of the land track, and individually recording a same address.

According to another embodiment of the present disclosure, there is provided an optical information recording medium playback apparatus for optically playing back an optical information recording medium operated by CAV or zone CAV, wherein a groove configured to wobble is formed in advance, and information is recorded in the groove and a land adjacent to the groove, an address is recorded by a wobble signal of the groove, a plurality of track addresses N of a land, and a plurality of track addresses (N−1) or (N+1) of the land are formed on a groove track, the track address N (=1, 2, 3, ... ) of the land is formed in adjacent grooves on both sides in a track traversing direction, with the track address N having a same angular phase and a same wobbling direction, and the track address (N−1) or (N+1) of the land is formed in the adjacent grooves on both sides in the track traversing direction with the track address (N−1) or (N+1) having a same angular phase and a same wobbling direction.

By the present disclosure, when recording is performed on both a groove and a land, it is possible to record an address of a land by only modulation of the groove. Address information of the land is defined by two pieces of the groove address information played back from the grooves on the both sides at the time of scanning the land.

BRIEF DESCRIPTION OF THE DRAWINGS

FIG. 3 is a schematic diagram for explaining a data structure of an ADIP word of the BD format;

FIGS. 7A and 7B are schematic diagrams illustrating an optical disc and wobbling of a track in an embodiment of the present disclosure;

FIG. 8 is a schematic diagram illustrating an example of address allocation of a groove/land for explaining an embodiment of the present disclosure;

DETAILED DESCRIPTION OF EMBODIMENTS

The embodiments described below are specific examples that are preferred in the present disclosure, and thus are accompanied by various technically preferable specifications. However, the range of the present disclosure is not limited to these embodiments unless there is a description of limiting the present disclosure in particular in the following description.

The below description will be given in the following order.
1. BD format
2. Embodiments
3. Variations

1. BD FORMAT

In the present disclosure, it is assumed that a format of address information, and so on conform to a BD (Blu-ray Disc (a registered trademark)) format. On this assumption, it is possible to use a large portion of the techniques in BD, which is a high-density optical disc having been in practical use. Accordingly, a description will be given of address information in the BD format prior to the description of the present disclosure.

Figure 1:
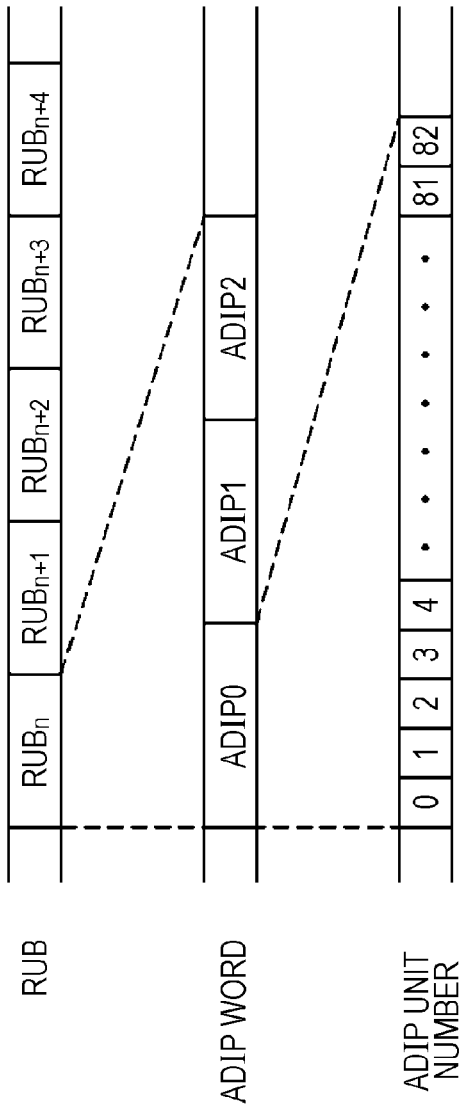
FIG. 1 is a schematic diagram for explaining address data of a BD format.

As illustrated in FIG. 1, main data to be written is a sequence of RUBs (Recording Unit Blocks) ($RUB_{n+0}$, $RUB_{n+1}$, $RUB_{n+2}$, $RUB_{n+3}$, ... ). A RUB is a unit of recording the main data (record playback data), and is assumed to have a predetermined length, for example 64 KB. Three ADIP (Address In Pregroove) words, namely ADIP0, ADIP1, and ADIP2 are allocated for each one RUB. ADIP0, ADIP1, and ADIP2 have the same address information with each other.

Further, one ADIP word includes 83 (the unit number 0 to 82) ADIP units. One ADIP word stores 24-bit address information, 12-bit auxiliary data, reference area, an error correction code, and so on. These pieces of information is represented using, for example 60 ADIP units out of the 83 ADIP units.

Figure 2:
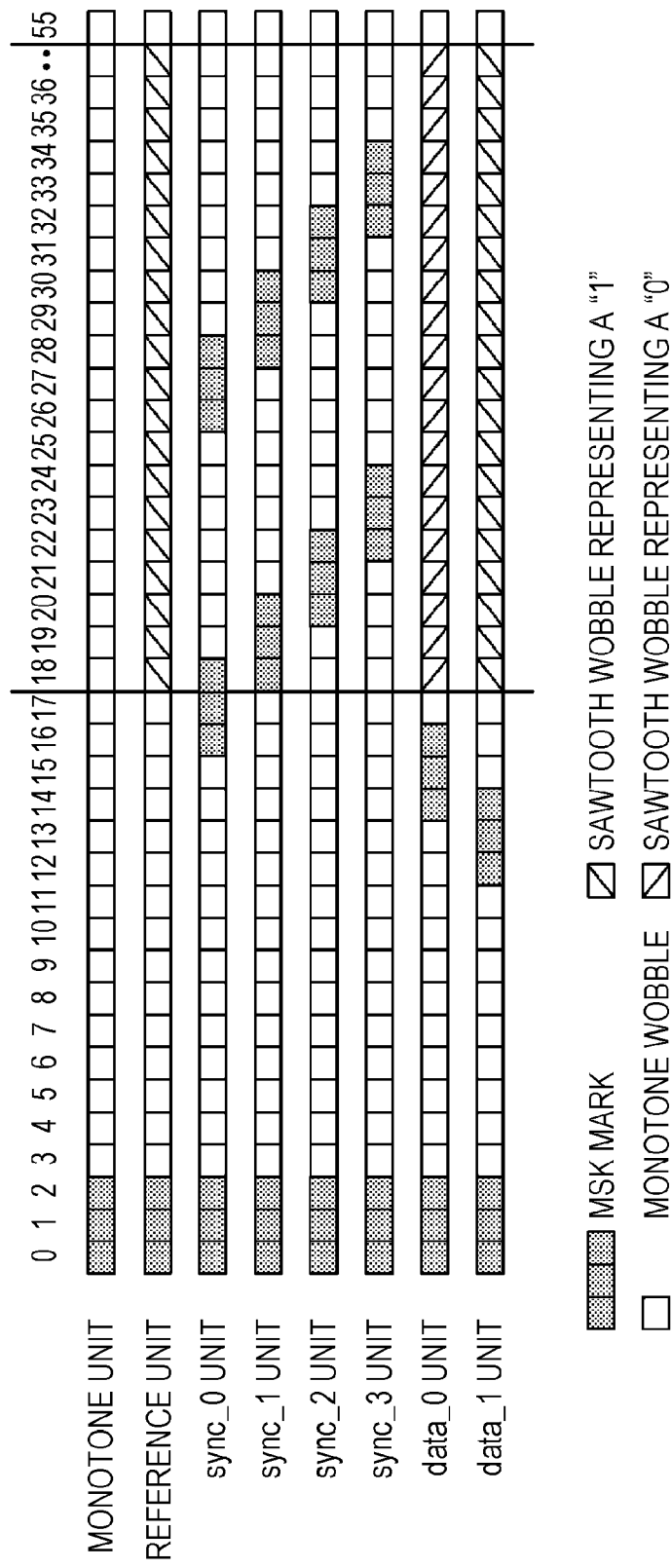
FIG. 2 is schematic diagram for explaining ADIP units of the BD format.

As illustrated in FIG. 2, 56 clusters of wobbles in total are determined to be an ADIP unit, and the ADIP unit represents one bit of "0" or "1", synchronization information, a reference unit, or a monotone unit. One wobble is one cycle of a fundamental wobble waveform ($\cos(2\pi ft)$), for example. Accordingly, one ADIP word includes (83×56) wobbles. FIG. 2 illustrates eight types of ADIP units (a monotone unit, a reference unit, four types of synchronization units, and two types of data units representing data "0" and "1", respectively). In this regard, in FIG. 2, the clusters of 35 wobbles are illustrated because of space restrictions.

As illustrated in FIG. 2, wobble numbers from 0 to 55 are added to an ADIP unit including 56 wobbles to make a distinction. For example, sections having a wobble number from 0 to 2, and so on are modulated by MSK (Minimum Shift Keying), and a reference unit and a data unit having the wobble numbers from 18 to 54 are modulated by STW (Saw Tooth Wobble). Unmodulated monotone wobbles are wobbled by a fundamental wave having a predetermined frequency ($\cos(2\pi ft)$).

The ADIP word has a data structure as illustrated in FIG. 3. An ADIP unit type in FIG. 3 corresponds to a type of an ADIP unit in FIG. 2. One ADIP word includes 60-bit data.

Figure 4:
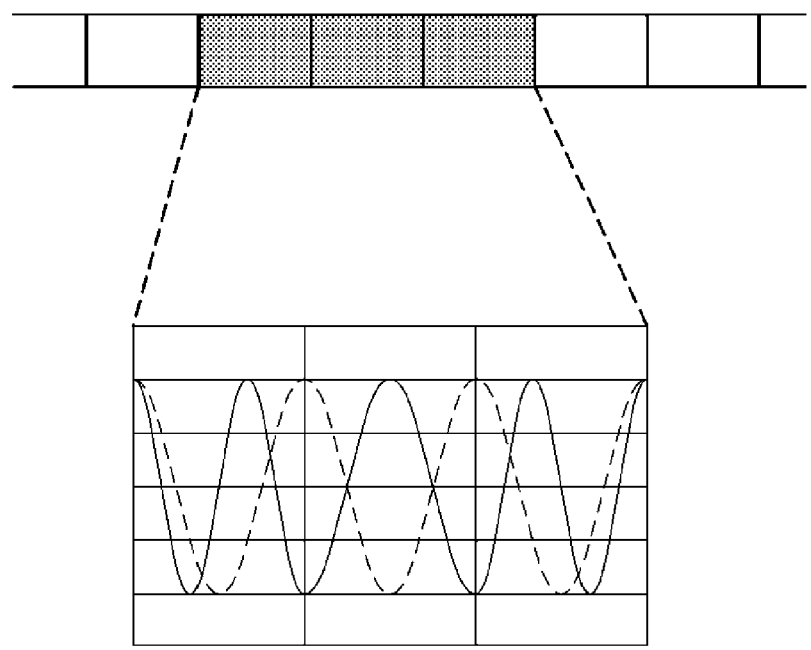
FIG. 4 is a waveform chart for explaining MSK.

As illustrated in FIG. 4, MSK includes three wobbles. The frequency of a front and a back wobbles is 1.5 times the frequency of the fundamental wave, and the polarity of the waveform of a center wobble is inverted with respect to a portion that is not MSK. MSK is disposed at the beginning (the 0-th to the 2nd wobbles) of each ADIP unit, and is used for detecting the beginning position of the ADIP unit.

Further, As illustrated in FIG. 2, MSK is disposed at the position of the 14-th to 16-th wobbles from the beginning of the ADIP unit of data0, and MSK is disposed at the position of the 12-th to 14-th wobbles from the beginning of the ADIP unit of data1. In this manner, data0 and data1 are represented by the positions of MSK.

In the ADIP unit of data0, MSK is set to 0, and STW representing 0 is disposed in the 18-th to the 55-th wobble sections from the beginning. In the ADIP unit of data1, MSK is set to 1, and STW representing 1 is disposed in the 18-th to the 55-th wobble sections from the beginning.

In the STW method, a second harmonic wave ($\sin(2\pi 2ft)$) is added to or subtracted from the fundamental wave ($\cos(2\pi ft)$) so as to generate a modulated waveform like a saw tooth. The amplitude of the second harmonic wave is about ¼ as small as the fundamental waveform. One of addition and subtraction is selected depending on "0" or "1" of data, and thus the modulated waveform becomes different. The wobble numbers of the reference unit and the data unit are repeatedly recorded in the 18-th to the 54-th sections.

In this manner, the reason for using two types of methods is to make it possible to compensate disadvantages of each method. In the MSK method, the three beginning wobbles of the ADIP unit are modulated so that one bit is recorded, and thus it is possible to use the wobbles as a basis of determining the position of the data at the time of playback. On the other hand, in the STW method, wobbles are repeatedly recorded in a wide range as very little change in waveform, and "0" or "1" is determined by integrating a playback signal at the time of playback. Accordingly, it is difficult to use the playback signal as information for detecting a delimiter of the data. However, the MSK method, which is a local recording method, is susceptible to the influence of defects caused by a flaw on the disc, dust, and so on. In the STW method, recording is kept for a longer period of time, and thus there is an advantage in that the method is unsusceptible to the influence of defects.

Figure 5A:
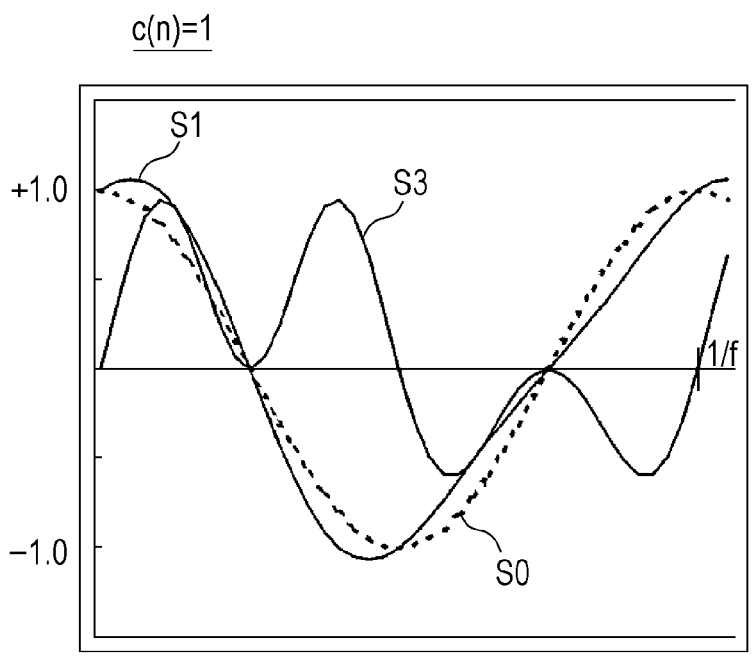
FIG. 5A is a waveform chart for explaining STW.

A detailed description will be given of a modulated wobble signal in the STW method with reference to FIGS. 5A, 5B, 6A, and 6B. In FIGS. 5A, 5B, 6A, and 6B, the horizontal axis represents time, and one cycle of the fundamental wobble waveform (that is to say, one wobble) is illustrated. The vertical axis represents a normalized amplitude. FIG. 5A illustrates a waveform in the case where data c(n) is "1", and FIG. 6A illustrates a waveform in the case where data c(n) is "0".

In FIG. 5A and FIG. 6A, a waveform illustrated by a broken line represents a fundamental wobble waveform S0 (=$\cos(2\pi ft)$). In the case where c(n)="1", a modulated waveform S1 is formed by adding a sin signal having a frequency two times the frequency of the fundamental wobble waveform S0 to the fundamental wobble waveform S0. That is to say, $S1 = A\cos(2\pi ft) + a\sin(2\pi 2ft)$. There is a relationship that A>a, and A=1, and a=0.2, for example. The modulated wobble waveform S1 is a waveform that is modulated such that a rising edge (an outside direction in the radial direction of the disc) is moderate in comparison with the fundamental wobble waveform S0 in time direction, and a falling edge (an inside direction in the radial direction of the disc) is sharp in comparison with the fundamental wobble waveform S0.

As illustrated in FIG. 6A, in the case where c(n)="0", a modulated waveform S2 is formed by subtracting a sin signal having a frequency two times the frequency of the fundamental wobble waveform S0 from the fundamental wobble waveform S0. That is to say, $S2 = A\cos(2\pi ft) - a\sin(2\pi 2ft)$. The modulated wobble waveform S2 is a waveform that is modulated such that a rising edge (an outside direction of the disc) is sharp in comparison with the fundamental wobble waveform S0 in time direction, and a falling edge (an inside direction of the disc) is moderate in comparison with the fundamental wobble waveform S0. Both of the modulated wobble waveforms S1 and S2 have a phase having a same zero-cross point as that of the fundamental wobble waveform, and this makes it possible to easily extract a clock at playback side.

In FIG. 5A and FIG. 6A, waveforms S3 and S4 illustrate the products of the sin signal ($\sin(2\pi 2ft)$) having a frequency two times the frequency of the fundamental wave, which is used for playback side processing, and the playback modulated wobble signal, respectively. That is to say, the waveform S3 is obtained by the playback modulated wobble waveform $S1 \times \sin(2\pi 2ft)$, and the waveform S4 is obtained by the playback modulated wobble waveform $S2 \times \sin(2\pi 2ft)$.

Figure 5B:
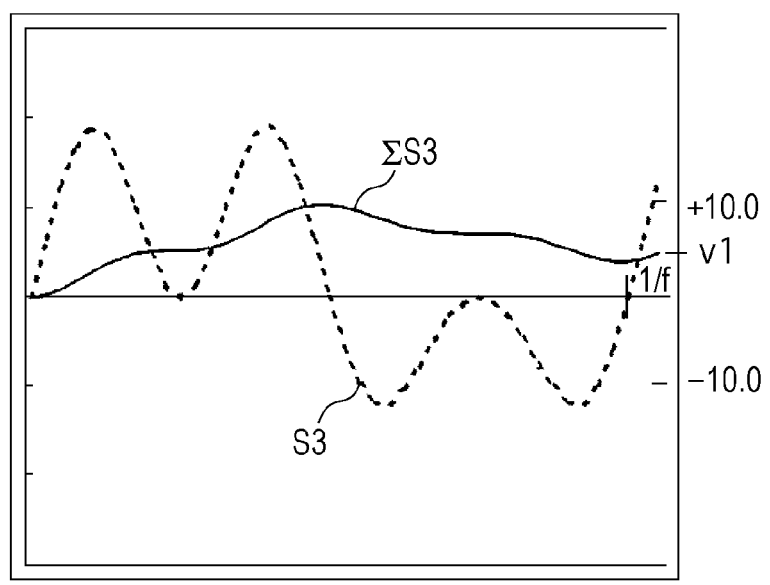
FIG. 5B is a waveform chart for explaining STW.
Figure 6A:
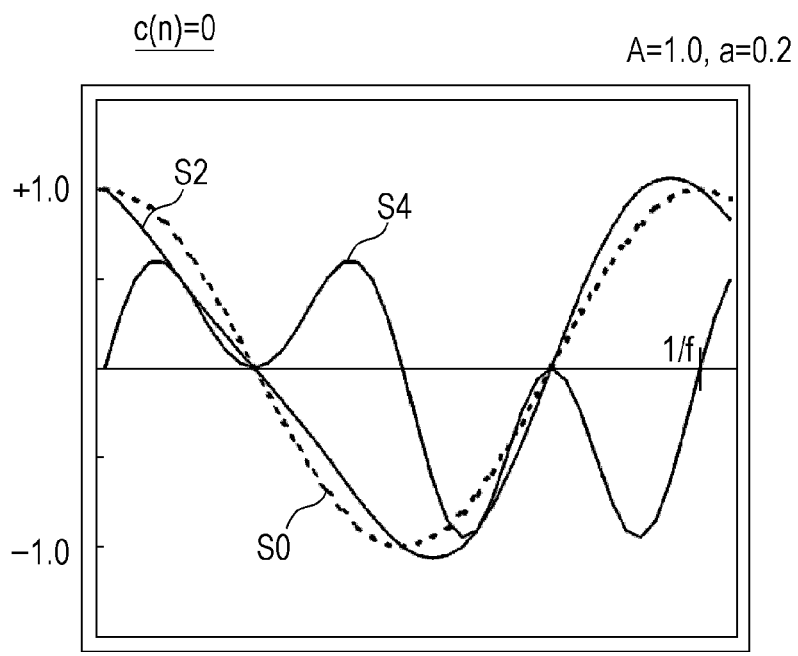
FIG. 6A is a waveform chart for explaining STW.
Figure 6B:
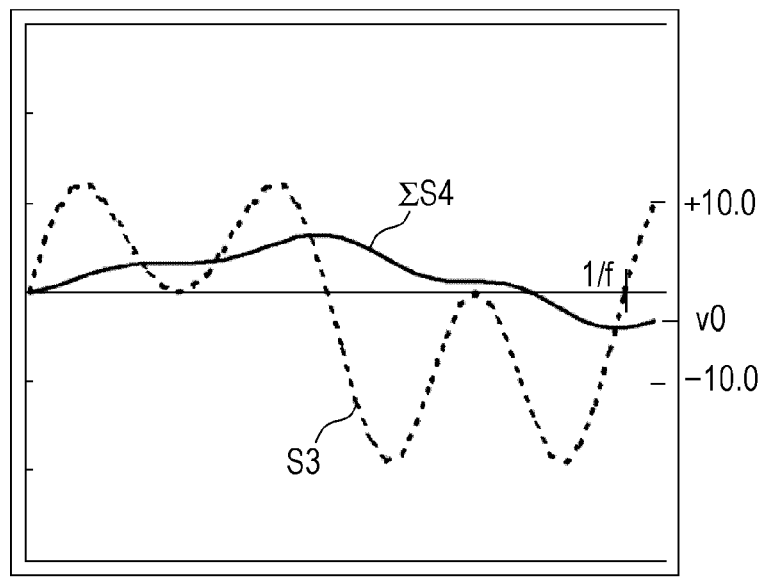
FIG. 6B is a waveform chart for explaining STW.

At the playback side, as illustrated in FIG. 5B and FIG. 6B, the waveforms S3 and S4 are integrated (added up) for one wobble cycle, respectively, so as to obtain integrated values $\Sigma S3$ and $\Sigma S4$. The integrated value $\Sigma S3$ at the point in time after passage of one wobble cycle becomes a positive value v1. On the other hand, the integrated value $\Sigma S4$ at the point in time after passage of one wobble cycle becomes a negative value v0. The integrated value is handled as v1=+1, and v0=−1, for example.

One bit of data is represented by 56 wobbles so that if all bits are +1, +56 is obtained as an integration result of 56 wobbles, whereas if all bits are −1, −56 is obtained as the integration result of the 56 wobbles. A playback chip sequence obtained as the integrated value of each wobble is multiplied by the same code sequence used at the time of recording. As a result, one bit of the data ("1"/"0") is determined on the basis of the integration result of the 56 wobbles.

2. EMBODIMENTS

Main Differences from BD Format

The main differences between an embodiment of the present disclosure and the above-described BD format are as follows.

In the BD format, a disc is rotated at a constant linear velocity (hereinafter referred to as CLV), whereas in the present disclosure, a disc is rotated at a constant angular velocity (hereinafter referred to as CAV). A disc may be divided in the radial direction to form a plurality of zones, and a zone CAV method, in which CAV control is performed in a zone, may be employed. By CAV or zone CAV, it is possible to make the fundamental wave of wobbles to have the same angular phase in the radial direction of the disc with each other in a spiral wobble track.

In the BD format, a groove recording method, in which recording is performed in a groove, is employed, whereas in the present disclosure, in order to increase the recording capacity, recording is performed both in the groove and on the land. In this regard, as described above, a gutter is referred to as a groove, and a track formed by a groove is referred to as a groove track. A groove is defined to be a part on which laser light is irradiated at the time of manufacturing an optical disc, an area sandwiched by adjacent grooves is referred to as a land. A track formed by a land is referred to as a land track.

In a groove track, it is possible to read a wobble address in the same manner as BD.

In a land track, if adjacent grooves on both sides are made to produce the same signal (the same frequency and the same phase), it is possible to read the wobble address. Accordingly, in the above-described CAV or zone CAV are necessary.

An Example of Optical Disc

As illustrated in FIG. 7A, for example, one round (one track) of a disc is divided into eight areas, and an address area1 in the track, an address area1 in the track, . . . , and an address area8 in the track are defined in sequence in the clockwise direction. For a track address, a same track address is defined for a pair of a groove address and a land address that are adjacent with each other. Distinction between a groove and a land is made on the basis of the tracking servo. That is to say, an optical disc playback apparatus is configured to invert the polarity of tracking between the case of playing back a groove track, and the case of playing back a land track. It is possible to distinguish a groove and a land depending on the polarity of tracking.

An address is recorded as a wobble groove, and the wobble groove is formed with a same angular phase from an inner circumference to an outer circumference. That is to say, as illustrated in FIG. 7B by an enlarged view, groove tracks are formed so as to wobble with a same angular phase in a same radial direction. As a result, when a land track is scanned, it is possible to read an address recorded on both sides of the adjacent groove tracks.

Disposition (Recording) of Address Information

A description will be given of disposition of address information according to an embodiment of the present disclosure with reference to FIG. 8. FIG. 8 schematically illustrates a groove track and a land track L that continues in the radial direction of a disc. As an example, an upper side in FIG. 8 is an inner side of the disc (a center side), and a lower side is an outer side of the disc. A groove is spirally formed from the inner side of the disc toward the outside, and track addresses are allocated so as to increase the number toward the outside. Further, it is assumed that a beam spot (recording/playback beam spot) is scanned from left to right in the facing direction to FIG. 8. A groove track and a land track adjacent with each other have a common address. In the example in FIG. 8, a groove track and a land track located at the outside thereof have a same track address.

A track address in a groove track is defined as . . . , N−1, N, N+1, N+2 for each one round of a track. Note that N=1, 2, 3, . . . As for a predetermined data unit, for example a RUB, a one-round track includes three RUBs, for example. A track address in a land track is defined in the same manner. FIG. 8 illustrates a part having track addresses (100, 101, and 102). In this regard, the notation of (#100_i) means that a track address is (100), and an in-track address is i (i=1, 2, . . . , 8).

The N-th groove track is alternately provided with a first section in which the track address N is recorded, and a second section in which the track address (N−1) is recorded. The first and the second sections are, for example sections of in-track addresses. In the groove track of (N=100), addresses are recorded as (#100_1)(#99_2)(#100_3)(#99_4)(#100_5)(#99_6) . . . .

Each groove address information has a data structure of an ADIP word in the same manner as the BD format. Accordingly, it is possible to reproduce address information by a decoder of a current BD playback apparatus. However, address information may be recorded in a groove with a data structure other than a BD fader.

A first section, in which the track address (N+1) is recorded, and a second section, in which the track address N is recorded, are alternately disposed in the next (N+1)-th groove track. In the groove track having a track address of (N=101), addresses are recorded as (#100_1)(#101_2)(#100_3)(#101_4)(#100_5)(#101_6) . . . . In this case, in the adjacent grooves on both sides in the radial direction of the disc (the groove track address N and the groove track address (N+1)), the addresses are recorded such that the first and the second sections, in which the common track address N (#100) is recorded, match with each other. In the example in FIG. 8, these sections are disposed so as to be aligned in the radial direction. That is to say, an address N is formed so as to be wobbled in the same radial direction to have the same angular phase.

In this manner, addresses are recorded in a groove so that in the N-th land track, only when a same address (#N_i) of the N-th track address is recorded on both sides of the groove track, it is possible to read the address. It is not possible to obtain an address in the sections that are not configured as the above. In the example in FIG. 8, in the land track (N=#100), it is possible to read a correct address in (#100_1), (#100_3), and (#100_5) . . . , which are formed to have the same angular phase. In the land track, the sections denoted by X are sections from which an address is not allowed to be read.

In the groove track of (N=#100), it is possible to read all the addresses. The addresses (#N_i) ((#100_1), (#100_3), (#100_5) . . . ) are correct addresses. However, it is possible to read (#N−1i) ((#99_2), (#99_4), (#99_5) . . . ), but these are not correct addresses. In FIG. 8, the addresses denoted by a bold line and large characters mean correct groove addresses and land addresses. It is possible to reproduce the addresses denoted by a thin line and small characters, but these are not correct addresses.

Further, in the land track of the track address (N+1) (for example, #101), only when the same address (#N+1_i) is recorded in both sides of the groove track, it is possible to read the addresses. In the sections other than that, it is not possible to obtain the addresses. In the example in FIG. 8, in the land track of (#101), it is possible to read a correct address in (#101_2), (#101_4), (#101_6) . . . , which are formed to have the same angular phase. In the land track, the sections denoted by X are sections from which an address is not allowed to be read.

In the groove track of (N=#101), it is possible to read all the addresses. The addresses (#N+1_i)((#101_2), (#101_4), (#101_6) . . . ) are correct addresses. However, it is possible to read (#N_i) ((#100_1), (#100_3), (#100_6) . . . ), but these are not correct addresses.

As described above, in an embodiment of the present disclosure, a track address N and a track address (N−1) are alternately reproduced in the groove track N. On the condition that the two track addresses ate alternately reproduced, a track address N having a larger number is assumed to be correct. The track address (N−1) is not a correct address, and thus is replaced by a correct track address N. It is possible to interpolate an in-track address on the basis of continuity.

In the land track N, a track address that was able to be read is handled as a correct address. It is possible to read a land track address alternately for each section. The address that was unable to be read is replaced by a correct track address N. It is possible to interpolate an in-track address on the basis of continuity.

In the example in FIG. 8 described above, a groove track and a land track on the outside thereof are configured to have a same track address. However, a groove track and a land track on the inside thereof may be configured to have a same track address. In this case, in the groove track having a track address N, a track address N is recorded in the first section, and a track address (N+1) is recorded in the second section.

Variations Track Address Disposition

Figure 9:
FIG. 9 is a schematic diagram illustrating another example of address allocation of a groove/land for explaining an embodiment of the present disclosure.

FIG. 9 illustrates a variation of track address disposition. In a groove track having an address N, a first section in which an address N is recorded is formed by two consecutive in-track addresses. The first section may be formed by three in-track address sections or more. In the address allocation illustrated in FIG. 9, correct addresses are obtained continuously two times in a groove track. As a correct groove track address, an address having a larger number is used. In a section in which a correct groove track address is not obtained, it is possible to obtain a correct address by interpolation. In a land track, it is possible to read two in-track addresses as a correct address. In a section from which reading is not possible, it is possible to obtain a correct land track address by interpolation.

Disc Playback Apparatus

Figure 10:
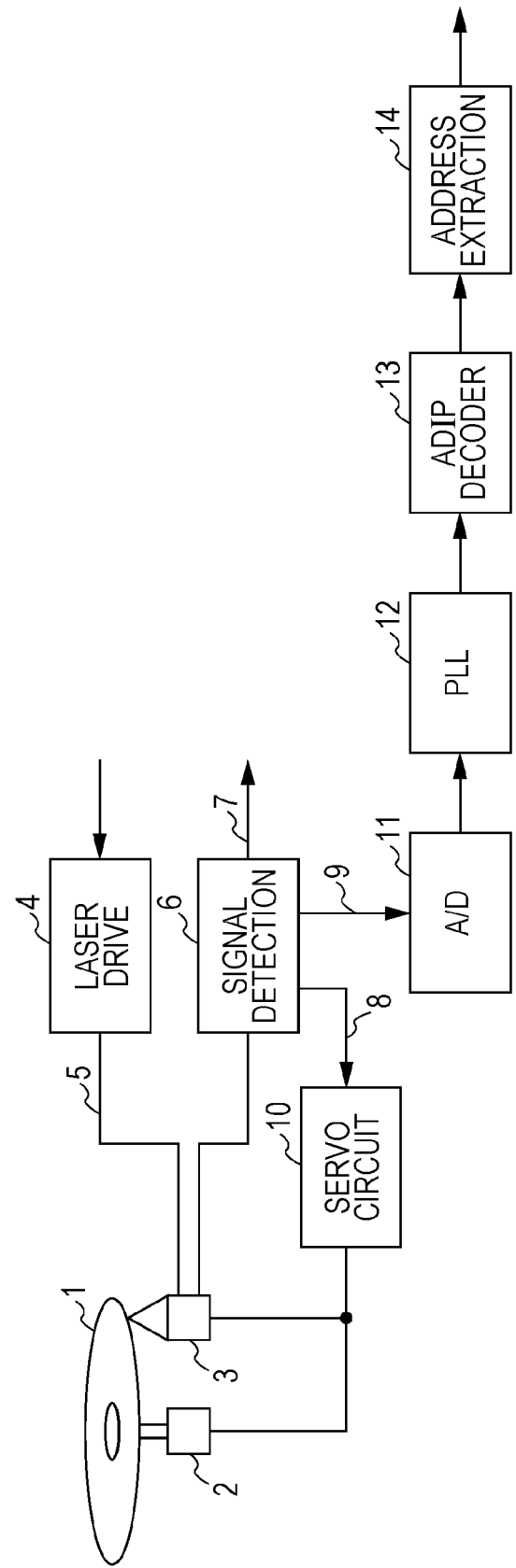
FIG. 10 is a block diagram illustrating a playback apparatus according to an embodiment of the present disclosure.

A description will be given mainly on address playback of a disc playback apparatus according to an embodiment of the present disclosure. As illustrated in FIG. 10, data is recorded on an optical disc 1 on which a groove address and a land address are recorded, and the data is played back from the optical disc 1.

The optical disc 1 is rotated by a spindle motor 2 at a constant angular velocity. That is to say, the optical disc 1 is rotated by the CAV method. The zone CAV method may be used. A drive signal is supplied to an optical head 3 from a laser drive section 4, a laser beam whose intensity is modulated in accordance with record data 5 is irradiated from the optical head 3 to the optical disc 1, and the data is recorded at a predetermined position of the optical disc 1, which is determined on the basis of the played-back address information.

A reading laser beam is irradiated from the optical head 3 on the optical disc 1, and the reflection light is detected by a photo detector in the optical head 3, and a signal detection section 6 detects a playback signal. From the signal detection section 6, a playback signal 7, a servo error signal 8, such as a focus error signal, a tracking error signal, and so on, and a wobble signal 9 are taken out.

The wobble signal 9 is an output signal of the detectors that are produced by dividing a photo-detection element into two in the track direction. For example, the sum signal of the two detectors is picked up as the wobble signal 9. The wobble signal 9 corresponds to the wobble waveform. When the wobbles on both sides of a track have a same phase, the level of the wobble signal 9 becomes maximum, and when the wobbles on both sides have an opposite phase, the level of the wobble signal 9 becomes minimum.

The servo error signal 8 is supplied to a servo circuit 10. The servo circuit 10 controls rotation of the spindle motor 2 at a constant angular velocity, and performs control on focus and tracking of the optical head 3.

The wobble signal 9 detected by the signal detection section 6 is supplied to an A/D converter 11, and is converted by the A/D converter 11 into a digital signal. The output signal of the A/D converter 11 is supplied to a digital PLL (Phase Locked Loop) 12. The PLL 12 outputs a clock in synchronism with the playback signal. The clock is used as a basis of timing of the processing at the time of playback.

The digital output of the wobble signal is supplied to an ADIP decode 13. The ADIP decode 13 decodes the address data, and so on recorded as STW for each ADIP word, and performs error correction. The address data decoded by the ADIP decode 13 is supplied to an address extraction section 14.

The address extraction section 14 identifies a groove track and a land track on the basis of the tracking servo. As described above, the address extraction section 14 selects a correct track address, and generates a track address of a section whose correct address is not obtained by interpolation.

3. VARIATIONS

In the above, descriptions have been specifically given of the embodiments of the present disclosure. However, the present disclosure is not limited to the individual embodiments described above. Various variations are possible within the spirit and scope of the present disclosure. For example, the configuration, the method, the process, the shapes, the materials, the numeric values, and so on that are described in the above-described embodiments are only examples. It is allowed to use different configuration, method, process, shapes, materials, numeric values, and so on from the above as necessary.

In this regard, the present disclosure can be configured as follows.

(1) An optical information recording medium operated by CAV or zone CAV, wherein a groove configured to wobble is formed in advance, and information is recorded in the groove and a land adjacent to the groove, an address is recorded by a wobble signal of the groove, the groove is alternately provided with a first section recording an address N (=1, 2, 3, . . . ) by the wobble signal, and a second section recording an address (N−1) or (N+1) by the wobble signal, in two groove tracks located on both sides of a land track, the first section of one of the groove tracks matches the second section of the other of the groove tracks, and an address of the groove is read from the first section, and an address of the land is read from the first and the second sections located on both sides of the land track, and individually recording a same address.

(2) An optical information recording medium operated by CAV or zone CAV, wherein a groove configured to wobble is formed in advance, and information is recorded in the groove and a land adjacent to the groove, an address is recorded by a wobble signal of the groove, a plurality of track addresses N of a land, and a plurality of track addresses (N−1) or (N+1) of the land are formed on a groove track, the track address N (=1, 2, 3, . . . ) of the land is formed in adjacent grooves on both sides in a track traversing direction, with the track address N having a same angular phase and a same wobbling direction, and the track address (N−1) or (N+1) of the land is formed in the adjacent grooves on both sides in the track traversing direction with the track address (N−1) or (N+1) having a same angular phase and a same wobbling direction.

(3) The optical information recording medium according to (1) or (2), wherein addresses of a groove and a land adjacent to each other are common.

(4) The optical information recording medium according to any one of (1), (2) and (3), wherein the groove is formed spirally or concentrically on an optical disc, and a track address is added to each one-round track.

(5) The optical information recording medium according to (4), wherein the track address is divided into parts to be defined as in-track addresses.

(6) An optical information recording medium playback apparatus for optically playing back an optical information recording medium operated by CAV or zone CAV, wherein a groove configured to wobble is formed in advance, and information is recorded in the groove and a land adjacent to the groove, an addresses is recorded by a wobble signal of the groove, the groove is alternately provided with a first section recording an address N (=1, 2, 3, . . . ) by the wobble signal, and a second section recording an address (N−1) or (N+1) by the wobble signal, and in two groove tracks located on both sides of a land track, the first section of one of the groove tracks matches the second section of the other of the groove tracks, wherein an address of the groove is read from the first section, and an address of the land is read from the first and the second sections located on both sides of the land track, and individually recording a same address.

(7) An optical information recording medium playback apparatus for optically playing back an optical information recording medium operated by CAV or zone CAV, wherein a groove configured to wobble is formed in advance, and information is recorded in the groove and a land adjacent to the groove, an address is recorded by a wobble signal of the groove, a plurality of track addresses N of a land, and a plurality of track addresses (N−1) or (N+1) of the land are formed on a groove track, the track address N (=1, 2, 3, . . . ) of the land is formed in adjacent grooves on both sides in a track traversing direction, with the track address N having a same angular phase and a same wobbling direction, and the track address (N−1) or (N+1) of the land is formed in the adjacent grooves on both sides in the track traversing direction with the track address (N−1) or (N+1) having a same angular phase and a same wobbling direction.

(8) The optical information recording medium playback apparatus according to (6) or (7), wherein addresses of a groove and a land adjacent to each other are common, and the addresses of the groove and the land are identified on the basis of a tracking servo.

(9) The optical information recording medium playback apparatus according to (6) or (7), wherein one of the two group addresses played back from the first section is determined to be a right groove address.

(10) The optical information recording medium playback apparatus according to (6) or (7), wherein an address allowed to have been read from the first section and the second section is determined to be the land address.

The present disclosure contains subject matter related to that disclosed in Japanese Priority Patent Application JP 2012-209172 filed in the Japan Patent Office on Sep. 24, 2012, the entire contents of which are hereby incorporated by reference.

What is claimed is:

1. An optical information recording medium operated by CAV or zone CAV,
wherein a groove configured to wobble is formed in advance, and information is recorded in the groove and a land adjacent to the groove,
an address is recorded by a wobble signal of the groove,
the groove is alternately provided with a first section recording an address N (=1, 2, 3, . . . ) by the wobble signal, and a second section recording an address (N−1) or (N+1) by the wobble signal,
in two groove tracks located on both sides of a land track, the first section of one of the groove tracks matches the second section of the other of the groove tracks, and
an address of the groove is read from the first section, and an address of the land is read from the first and the second sections located on both sides of the land track, and individually recording a same address.

2. An optical information recording medium operated by CAV or zone CAV,
wherein a groove configured to wobble is formed in advance, and information is recorded in the groove and a land adjacent to the groove,
an address is recorded by a wobble signal of the groove,
a plurality of track addresses N of a land, and a plurality of track addresses (N−1) or (N+1) of the land are formed on a groove track,
the track address N (=1, 2, 3, . . . ) of the land is formed in adjacent grooves on both sides in a track traversing direction, with the track address N having a same angular phase and a same wobbling direction, and
the track address (N−1) or (N+1) of the land is formed in the adjacent grooves on both sides in the track traversing direction with the track address (N−1) or (N+1) having a same angular phase and a same wobbling direction.

3. The optical information recording medium according to claim 1,
wherein addresses of a groove and a land adjacent to each other are common.

4. The optical information recording medium according to claim 1,
wherein the groove is formed spirally or concentrically on an optical disc, and a track address is added to each one-round track.

5. The optical information recording medium according to claim 4,
wherein the track address is divided into parts to be defined as in-track addresses.

6. An optical information recording medium playback apparatus for optically playing back an optical information recording medium operated by CAV or zone CAV,
wherein a groove configured to wobble is formed in advance, and information is recorded in the groove and a land adjacent to the groove,
an addresses is recorded by a wobble signal of the groove,
the groove is alternately provided with a first section recording an address N (=1, 2, 3, . . . ) by the wobble signal, and a second section recording an address (N−1) or (N+1) by the wobble signal, and
in two groove tracks located on both sides of a land track, the first section of one of the groove tracks matches the second section of the other of the groove tracks,
wherein an address of the groove is read from the first section, and an address of the land is read from the first and the second sections located on both sides of the land track, and individually recording a same address.

7. An optical information recording medium playback apparatus for optically playing back an optical information recording medium operated by CAV or zone CAV,
wherein a groove configured to wobble is formed in advance, and information is recorded in the groove and a land adjacent to the groove,
an address is recorded by a wobble signal of the groove,
a plurality of track addresses N of a land, and a plurality of track addresses (N−1) or (N+1) of the land are formed on a groove track,
the track address N (=1, 2, 3, . . . ) of the land is formed in adjacent grooves on both sides in a track traversing direction, with the track address N having a same angular phase and a same wobbling direction, and the track address (N−1) or (N+1) of the land is formed in the adjacent grooves on both sides in the track traversing direction with the track address (N−1) or (N+1) having a same angular phase and a same wobbling direction.

8. The optical information recording medium playback apparatus according to claim 6, wherein addresses of a groove and a land adjacent to each other are common, and the addresses of the groove and the land are identified on the basis of a tracking servo.

9. The optical information recording medium playback apparatus according to claim 6, wherein one of the two group addresses played back from the first section is determined to be a right groove address.

10. The optical information recording medium playback apparatus according to claim 6, wherein an address allowed to have been read from the first section and the second section is determined to be the land address.

* * * * *